United States Patent [19]

Maine et al.

[11] Patent Number: 5,617,101
[45] Date of Patent: Apr. 1, 1997

[54] SATELLITE-BASED GEOLOCATION CALIBRATION SYSTEM AND METHOD

[75] Inventors: Kristine P. Maine, Phoenix; Dean P. V. Heuvel; Brent M. McKay, both of Chandler, all of Ariz.

[73] Assignee: Motorola, Inc., Schaumburg, Ill.

[21] Appl. No.: 363,854

[22] Filed: Dec. 27, 1994

[51] Int. Cl.$^6$ .............................. H04B 7/185; H04B 1/60; H04B 17/00
[52] U.S. Cl. .............................. 342/358; 455/9; 455/12.1; 455/67.5
[58] Field of Search ...................... 342/357, 358, 342/174; 455/9, 10, 54.1, 54.2, 67.5, 67.1, 12.1, 13.1

[56] References Cited

U.S. PATENT DOCUMENTS 5,119,504  6/1992  Durboraw, III ...................... 455/54.1
5,365,447  11/1994  Dennis ...................................... 364/449
5,365,451  11/1994  Wang et al. ............................. 364/449

Primary Examiner—Gregory C. Issing
Attorney, Agent, or Firm—Kevin K. Johanson

[57] ABSTRACT

A calibration system utilizing existing location techniques for a global radio telecommunication system 10 autonomously calibrates the communication system's location system by routing precision location data through system 10. Calibration reduces system errors by allowing time slots to remain narrow. The precision data is carried by existing commands throughout the system to measure location errors inserted by satellites 12. A gateway 16 compiles and evaluates received calibration data and determines when to update all gateways 16 with new satellite variance data tables 435. The calibration system provides early warning of degradation of system components and long-term analysis of system performance.

9 Claims, 5 Drawing Sheets

SATELLITE-BASED GEOLOCATION CALIBRATION SYSTEM AND METHOD

RELATED INVENTION

This application is related to commonly assigned United States Patent Applications:

"Geolocation Responsive Radio Telecommunication System and Method Therefor", having Ser. No. 8/105,730, filed Aug. 11, 1993, and assigned to the assignee of the present invention; and "Location System And Method With Acquisition Of Accurate Location Parameters", having Ser. No. 8/105,227, filed Aug. 11, 1993, and assigned to the assignee of the present invention.

1. Field of the Invention

The present invention relates generally to systems that determine the locations of subscriber units. More specifically, the present invention relates to calibration of non-coherent communication systems which determine the Doppler frequency and/or propagation delay of signals transmitted between subscriber units and satellites for use as location parameters.

2. Background of the Invention

A need exists for calibration of a substantially global radio telecommunications system that provides communication services to substantially any point on or near the surface of the earth. For such a system to achieve widespread acceptance, it should be capable of adapting to variable conditions present in the system such as aging and system degradation error.

Such a global radio telecommunications system and other radio telecommunications systems must know the locations of subscriber units, at least for normal "paging" operations. It would be possible for subscriber units to initiate calls without a known location, but, at a minimum, in order to efficiently receive a call, the unit's location must be known to the system. For other non-technical reasons, it may also be necessary to establish the location of a subscriber unit before allowing access to the system. Performance of the location system may be critical to resolving billing, access, and other location-related issues. It is critical not only that the system be designed to provide sufficient location resolution, but that the system be monitored and calibrated to assure continued performance through its operational lifetime. It is desirable to have a calibration system that automatically and autonomously calibrates a geolocation system without intensive or extensive system intervention.

It is also desirable to have a calibration system for a geolocation system capable of characterizing measurement error for the system satellites without requiring manual stimulation or other manual intervention.

It is also desirable to have a calibration system providing early warning detection of degradation of system performance due to increased error in the measurement data for any particular satellite.

It is also desirable for such a calibration system to be capable of providing the means and method for long-term analysis of geolocation functional performance including drift and system component degradation.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF A PREFERRED EMBODIMENT

Figure 1:
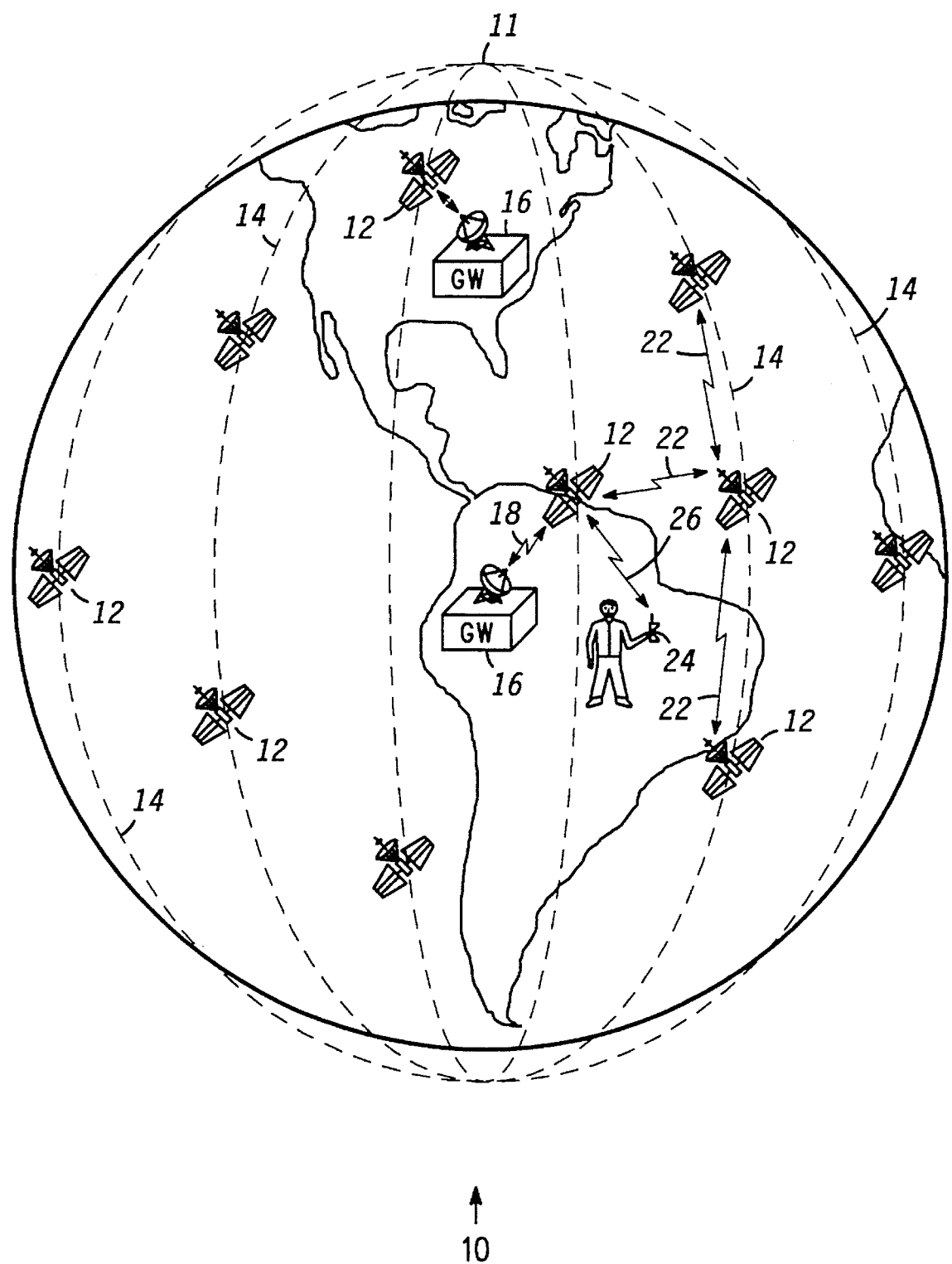
FIG. 1 is a layout diagram of an environment within which a radio telecommunications system incorporating a locating system and method may operate, in accordance with an embodiment of the present invention.

FIG. 1 is a layout diagram of an environment within which a radio telecommunications system 10 that incorporating a locating system and method may operate, in accordance with an embodiment of the present invention. System 10 includes a constellation 11 consisting of several satellites 12 placed in relatively low orbits 14 around the earth. Due to the configuration of constellation 11, at least one of satellites 12 is desirably within view of each point on the surface of the earth at all times.

System 10 additionally includes one or more gateways (GW) 16. GW 16 reside on the surface of the earth and are in data communication with nearby ones of satellites 12 through GW communication channels 18. Satellites 12 are also in data communication with one another using crosslink communication channels 22. Hence, through constellation 11 of satellites 12, a GW 16 may control communications delivered to any region of the earth. However, the region controlled by each GW 16 is preferably associated with one or more specific geo-political jurisdictions, such as one or more countries. Gateways 16 couple to public switched telecommunication networks (not shown), from which calls directed toward subscribers of system 10 may be received and to which calls placed by subscribers of system 10 may be sent.

System 10 also includes any number, potentially in the millions, of locatable subscriber units (SUs). SUs may be configured as conventional portable radio communication equipment. In other words, SUs may be battery powered, may consume relatively low power, and may include relatively small antennas. System 10 accommodates the movement of SUs anywhere on or near the surface of the earth. However, nothing requires SUs to move, and system 10 operates satisfactorily if a portion of the entire population of SUs remains stationary. SUs are configured to engage in communications with satellites 12 over portions of the electromagnetic spectrum allocated by governmental agencies associated with various geopolitical jurisdictions. SUs communicate with nearby satellites 12 through uplink communication channels 26.

A number of GWs 16 maintain subscriber databases that are relevant to a discrete portion of the population of SUs. The database may include information describing features associated with SUs, rates to be associated with SUs, current locations for SUs, and other information. Each SU is assigned to one of GWs 16, and that GW 16 is considered the "home" GW for an SU.

Due to the low earth orbits, satellites 12 constantly move relative to the earth. In the preferred embodiments, satellites 12 move in orbits at an altitude in the range of 500–1000 km above the earth. If, for example, satellites 12 are placed in orbits about 780 km above the earth, then satellite 12 travels at a speed of around 25,000 km/hr with respect to a point on the surface of the earth when overhead. Electromagnetic signals traveling at or near the speed of light between an SU positioned near the surface of the earth and a satellite 12 in such an orbit will require a propagation duration of 2–3 msec or more, depending on the satellite's angle of view. Moreover, electromagnetic signals traveling between an SU positioned near the surface of the earth and a satellite 12 in such an orbit may experience a considerable Doppler component of frequency shift, the precise value of which is dependent on a source frequency and velocity of the satellite relative to SU.

SUs in system 10 require accurate location data to effectively route communications to SUs and to allow system access by SUs. Special purpose SUs are employed to perform calibration functions within system 10. Both SUs and calibration subscriber units CSU 24 communicate with system 10 utilizing identical methods. CSU 24 is comprised of an independent precision location source coupled with a basic SU. The independent precision location source may be either a dynamic type such that location data is updated regularly, or it may be a static type such that precision location data is fixed according to the present location of CSU 24.

Figure 2:
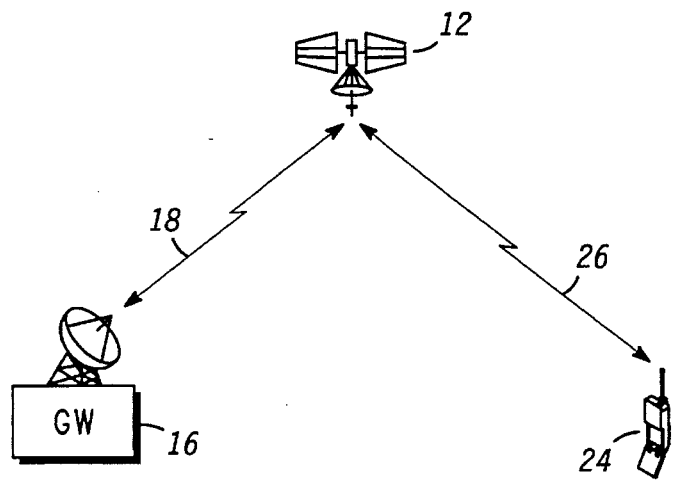
FIG. 2 is a typical communication path between a calibration subscriber unit and a satellite, and also a typical communication path between a satellite and a gateway for delivering calibration data to a gateway, in accordance with an embodiment of the present invention.

FIG. 2 shows a typical communication path between a calibration subscriber unit 24 and a satellite 12, and also a typical communication path between satellite 12 and GW 16 for delivering calibration data to GW 16, in accordance with an embodiment of the present invention. System 10 (see FIG. 1) communicates through satellites 12 with CSUs 24 using a limited amount of the electromagnetic spectrum. In the preferred embodiment, a combined frequency division multiplex (FDM), time division multiplex (TDM) scheme is employed. For example, different channels may be assigned to different time slots at a common frequency, and different channels may be assigned to different frequencies at common time slots. Channels are specified or defined by identifying both a frequency and time slot. Each satellite 12 controls the implementation of the FDM/TDM scheme for its communications. CSUs 24 conform their operations to the FDM/TDM standards set by satellites 12.

Channels may be grouped together into discrete channel sets. Desirably, each of these discrete channel sets is orthogonal to all other channel sets. In other words, simultaneous communications may take place at a common location over every channel in every channel set without significant interference. Conventional cellular communication techniques may be employed by assigning channel sets and employing a reuse scheme which prevents adjacent cells from using common channel sets.

Utilizing this established communication channel, CSU 24 and satellite 12 exchange multiple transmission bursts from which fundamental signal propagation parameters are extracted. These propagation parameters include time of arrival (TOA) and frequency of arrival (FOA) for signals arriving at each of CSU 24 and satellite 12. Generation of these parameters is not the subject of this invention, but is described in detail in the related applications as cited above.

Upon completion of parameter extraction, CSU 24 forwards these parameters in an access request message to satellite 12 using the established uplink communication channel 26. Satellite 12 retrieves its own TOA and FOA parameters as established during uplink communication channel set-up and appends these parameters to an access request message as received from CSU 24. Satellite 12 utilizes a previously established GW communication channel 18 to forward CSU 24 access request message containing TOA and FOA parameters from both the CSU 24 and satellite 12.

Gateway 16 receives an access request as sent by satellite 12. Gateway 16 stores TOA and FOA from both satellite 12 and CSU 24 for processing and analysis. Gateway 16 utilizes the stored TOA and FOA parameters to estimate the location of CSU 24.

Figure 3:
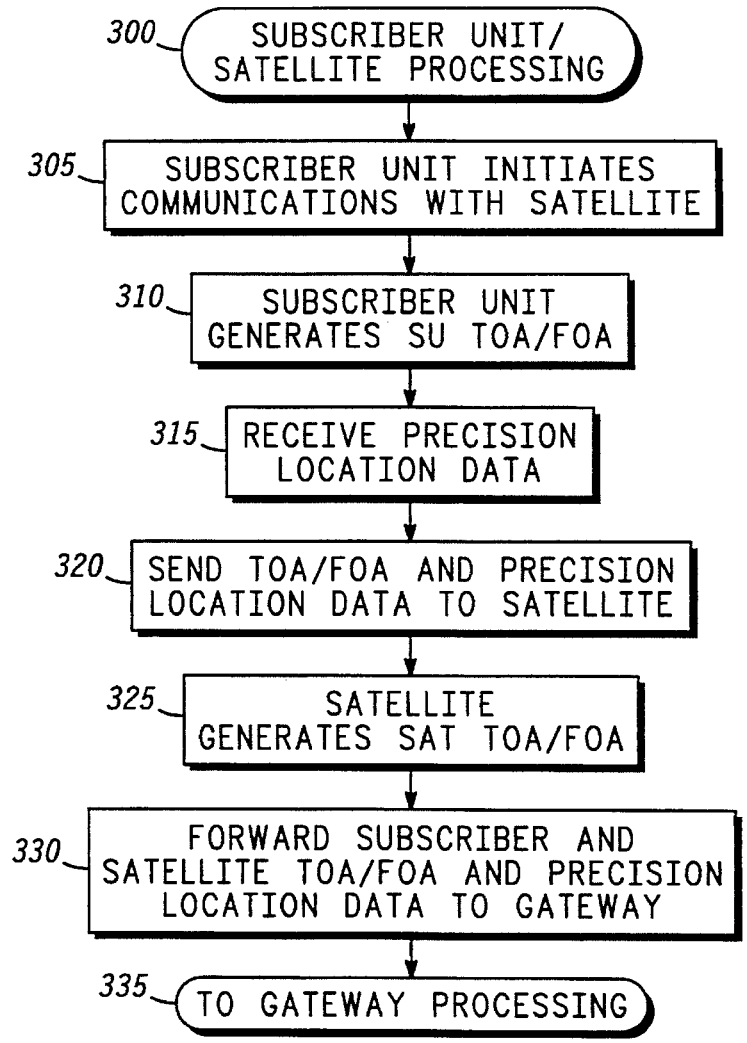
FIG. 3 is a flowchart of communication between a calibration subscriber unit and a satellite, and communication from a satellite to a gateway, in accordance with an embodiment of the present invention.

FIG. 3 is a flowchart of communication between a calibration subscriber unit CSU 24 and a satellite 12, and communication from satellite 12 to GW 16, in accordance with an embodiment of the present invention.

A method 300 performs parameter generation and collection for submission to GW processing. A task 305 establishes a dedicated communication channel 26 between CSU 24 and satellite 12 or task 305 may identify an existing communication channel 26. This dedicated channel 26 may be established by either a CSU 24 or by satellite 12 as directed by GW 16.

Following task 305, a task 310 utilizes uplink communication channel 26 for exchanging multiple messages between CSU 24 and satellite 12. The succession of messages allows both CSU 24 and satellite 12 to refine their individual TOA and FOA parameters.

A task 315 receives precision location data from an independent source, which may include an independent location determination device such as GPS or a predetermined location value for fixed-location CSUs 24.

A task 320 combines the precision location data with a CSU's 24 TOA and FOA as determined in task 310 into an access request message. CSU 24 transmits this access request message to satellite 12 using uplink communication channel 26.

In a task 325, satellite 12 receives the access request message containing CSU's 24 TOA, FOA and precision location data. Satellite 12 then appends its specific TOA and FOA to that of CSU 24 to form a satellite access request message.

A task 330 forwards this satellite access request to GW 16 using existing GW communication channel 18. Subscriber unit and satellite processing then complete at 335 and analysis then passes to GW processing.

Figure 4:
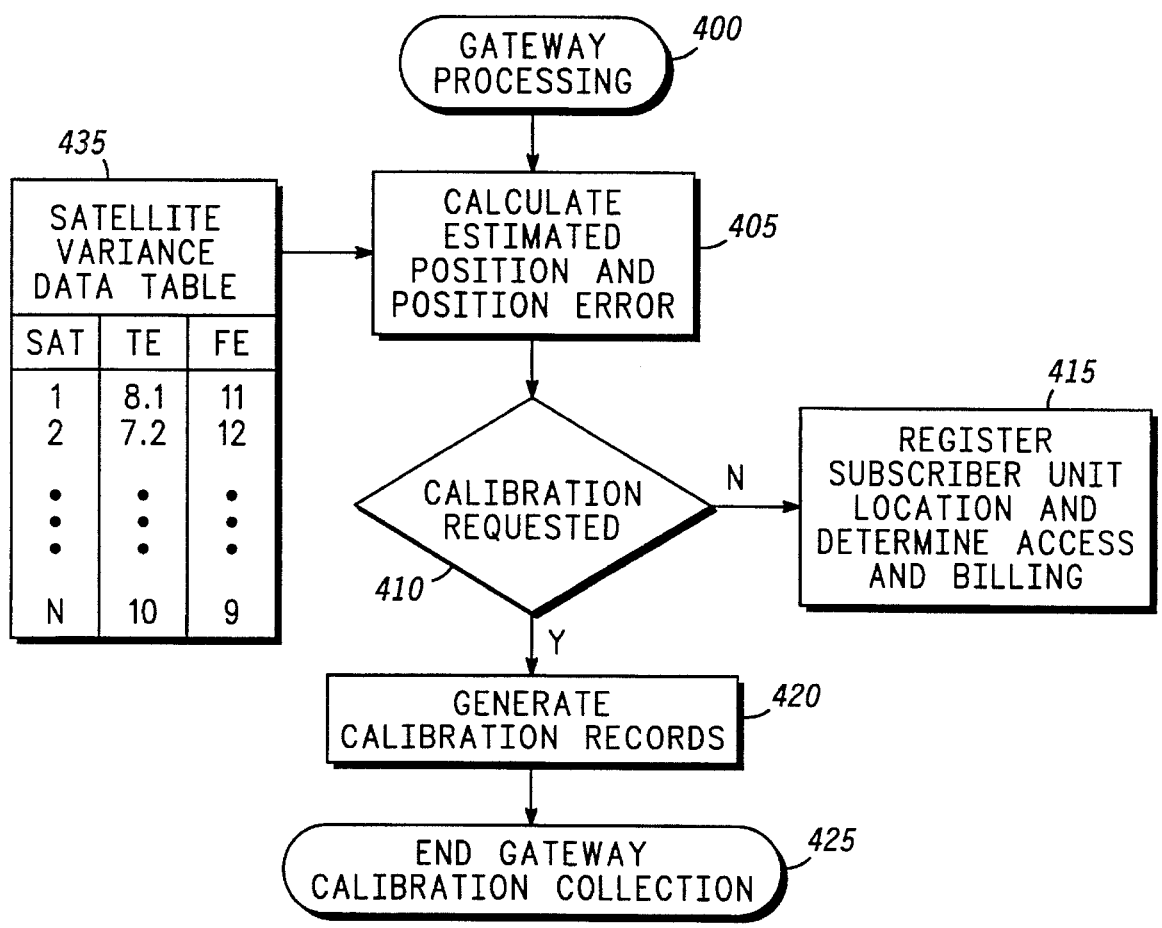
FIG. 4 is a flowchart for determining a location of CSU by using both measured TOA and FOA values contained in an access request message, in accordance with an embodiment of the present invention.

FIG. 4 is a flowchart for determining a location of CSU 24 by using both measured TOA and FOA values contained in an access request message, in accordance with an embodiment of the present invention.

A task 405 utilizes both satellite TOA/FOA and CSU TOA/FOA values to calculate a CSU 24 location based upon existing satellite variance data parameters 435. This process is equivalent to a process used to locate a typical SU (non-CSU) in system 10. Existing satellite variance data table 435 contains satellite identifiers with their respective calibrated time error (TE), and frequency error (FE) including bias parameters. A location error is also generated and stored in a calibration record when calibration is requested.

A query task 410 analyzes the satellite access message to determine if the message received by satellite 12 originated from a CSU 24. If a CSU 24 originated the message, then GW 16 retains all necessary information contained in the satellite access message as well as the calculated location derived from task 405.

If the access message originated from a non-calibration SU, then a task 415 performs a general registration of SU location to facilitate typical communications such as call setup, resource allocation, and proper billing.

If task 410 determined that a CSU 24 originated the satellite access request message, then a task 420 creates a calibration record including all necessary information received in the satellite access request message as well as the calculated location derived from task 405. This completes the collection of calibration data 425 by GW 16.

Figure 5:
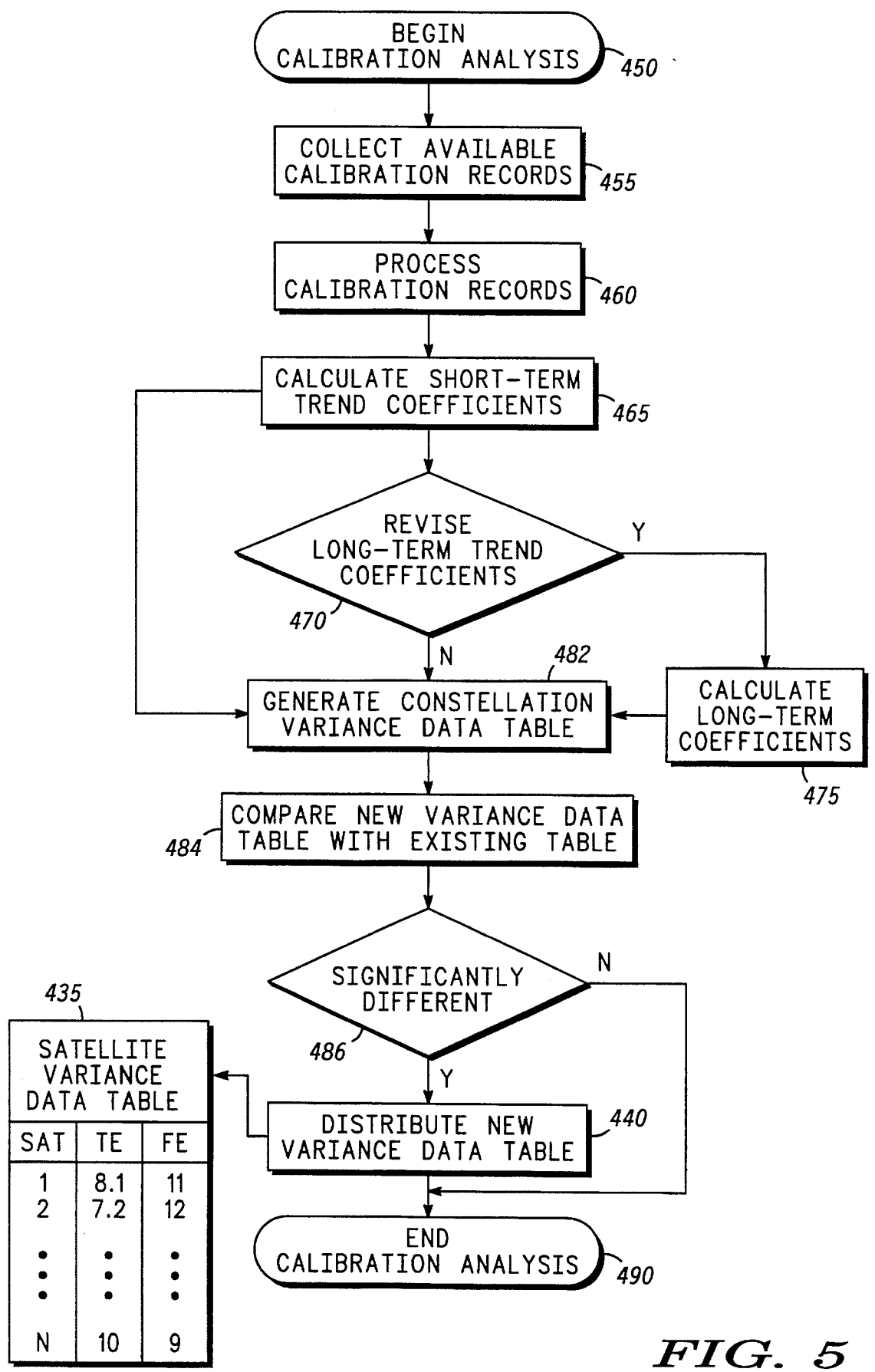
FIG. 5 is a flowchart for analyzing calibration record information and for generating variance data for utilization of all subsequent gateway location determination processes, in accordance with an embodiment of the present invention.

FIG. 5 shows a flowchart for analyzing calibration record information and for generating variance data for utilization in all subsequent GW location determination processes, in accordance with an embodiment of the present invention.

A task 455 collects available stored calibration records compiled during GW processing in FIG. 4, including records from all accessible GW 16 equipment or various GW 16 as specified by the system. Task 455 may actively request each GW 16 in system 10 to forward collected location calibration records, or, alternatively, may passively receive location calibration records forwarded from each GW 16.

A task 460 processes the collected calibration records. This process selects representative records to be stored for later use in long-term trend analysis, and combines all records for further analyses.

A task 465 utilizes the collected calibration records to calculate short-term variance coefficients representing short-term parameter variance values. These short-term changes typically represent sporadic deviations from nominal operations of system 10 including satellite 12 short-term orbital anomalies and other transient equipment effects, as well as constellation changes represented by addition or deletion of individual satellites 12.

A query task 470 determines if long-term coefficients need to be updated. This updating process occurs less frequently because these effects are generally less volatile because they relate generally to equipment aging. If necessary, a task 475 utilizes the collected long-term calibration records to calculate coefficients representing long-term variances in system 10. These variances typically represent system 10 evolutionary changes, e.g., satellite 12 equipment aging considerations.

A task 482 utilizes both short-term coefficients and long-term coefficients to calculate satellite 12 variance values for use in future location determinations. This calculation produces variance values for TOA and FOA measurements unique to each satellite 12 but not unique to an individual SU.

A task 484 compares the variance data table generated by task 482 with the variance data table which is currently in use at each GW 16. Task 484 identifies significant differences between the newly computed variance data table and the currently used variance data table.

A query task 486 then determines if the newly generated variance data table contains elements significantly different from elements of the current variance data table. This determination results from the comparison of each variance change to a predefined threshold value.

If query task 486 determines that a significant change in variance data has occurred, a task 440 distributes the newly generated variance data table to each GW 16 for use in subsequent location processing. This distribution may be immediate or may be delayed to coincide with other system configuration deliveries to various GWs 16.

Figure 6:
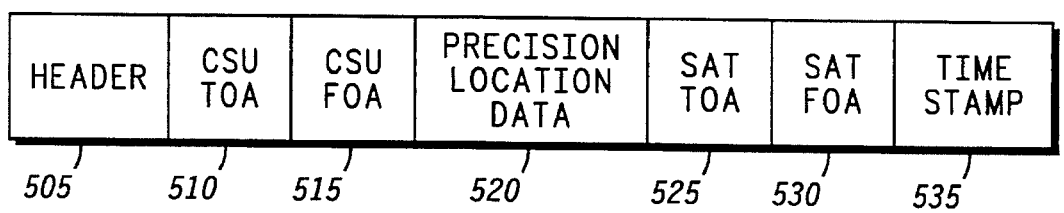
FIG. 6 shows a data format of a satellite access control signal containing CSU and satellite TOA and FOA values, along with precision location data of CSU, in accordance with an embodiment of the present invention.

FIG. 6 shows a data format of a satellite access control signal containing CSU 24 and satellite 12 TOA and FOA values, along with precision location data of CSU 24, in accordance with an embodiment of the present invention. FIG. 6 shows the configuration of a typical satellite access request message as compiled by satellite 12.

Satellite access request message 500 comprises multiple data fields. Header 505 contains message header information typical of messages in system 10. Header 505 may include information necessary to route the message to the intended destination GW 16.

CSU TOA 510 contains TOA data measured by CSU 24. CSU FOA 515 contains FOA data measured by CSU 24. Precision location data 520 contains precision location data received from a location data source such as an alternate location source 620 or fixed-location data 720. CSU TOA, CSU FOA, and precision location data 520 are generated at CSU 24 as described above.

Satellite TOA 525 contains TOA data measured by satellite 12. This datum is inserted into the message by satellite 12. Satellite FOA 525 contains FOA data measured by satellite 12. This data is inserted into the message by satellite 12. Time-stamp 535 contains time-stamp information representing the time at which the CSU 24 made its TOA and FOA measurements. Data for this field is provided by the CSU 24.

Figure 7:
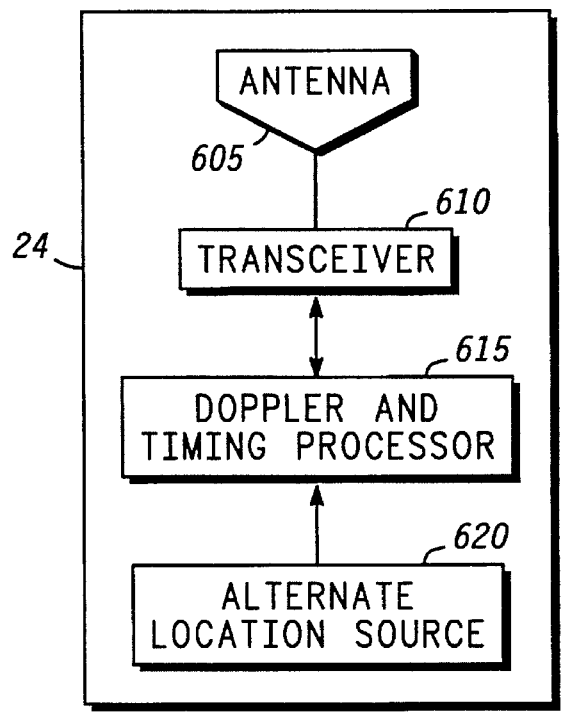
FIG. 7 is a block diagram of a calibration subscriber unit, in accordance with an embodiment of the present invention.

FIG. 7 is a block diagram of a CSU 24, in accordance with an embodiment of the present invention. CSU 24 comprises an antenna 605 for providing transmission and reception signal gain. CSU 24 also includes a transceiver 610 for transmitting and/or receiving signals on uplink communication channel 26 as discussed in connection with FIGS. 1 and 2.

A Doppler and timing processor 615 directs both transmitting and receiving functions. Processor 615 during an acquisition of a communication channel, monitors a receive channel and performs estimations of both Doppler frequency and propagation timing. These estimations are then used in transmission to fall within the timeslot specifications of timing at satellite 12. Iterations of this process refine these Doppler frequency and propagation timing values. These values are then used as the TOA and FOA values as discussed above.

Alternate location source 620 provides precision location data to Doppler and timing processor 615 for delivery to GW 16 via satellite 12. This precision location data may be derived from a number of location services or sources such as Global Positioning System (GPS), GLONASS, or Loran. Gateway processing utilizes precision location data for comparison with system-calculated location for derivation of variance data.

Figure 8:
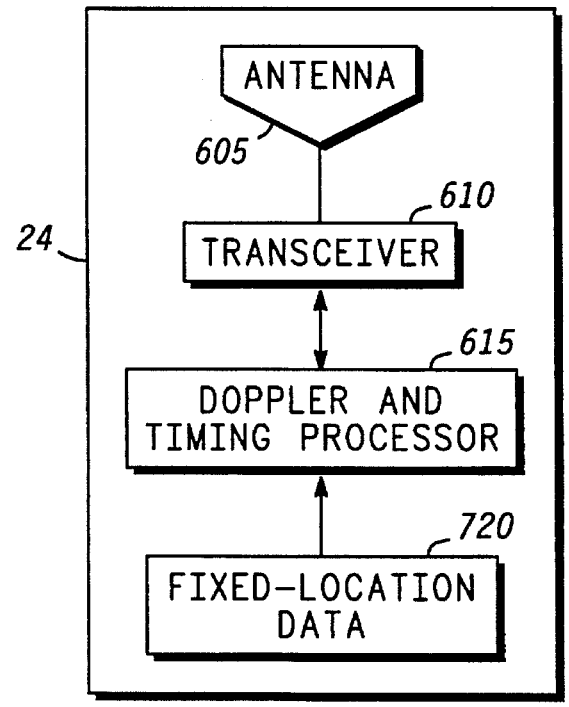
FIG. 8 is a block diagram of a calibration subscriber unit, in accordance with an embodiment of the present invention.

FIG. 8 is a block diagram of an alternate embodiment of CSU 24, in accordance with an embodiment of the present invention. CSU 24 comprises antenna 605, transceiver 610, Doppler and timing processor 615, and fixed-location data source 720. Antenna 605, transceiver 610 and Doppler and timing processor 615 are the same as those in CSU 24 (FIG. 7).

Fixed-location data source 720 provides precision location data to Doppler and timing processor 615 for delivery to GW 16 via satellite 12. CSU 24 generally is located at a fixed site where location data remains constant and may therefore be stored for use by CSU 24 or provided external to CSU 24 for use in GW calibration processing. FIG. 8 shows fixed-location data source 720 to be inclusive, however, one skilled in the art would recognize that fixed-location data source 720 could be any form of external storage as well such as floppy disk, or manual data entry such as from a keypad.

In summary, the present invention provides an improved geolocation calibration system and method. The calibration system and method are compatible with the needs of a communication system. For example, satellites orbiting the earth provide different geometries with which subscriber units must compatibly interact.

The geometries and more particularly the transmission characteristics of particular satellites require accurate timing and frequency adjustments by subscriber units. These frequency and timing adjustments or parameters are utilized by a GW to determine location of subscriber units for reliable call setup, access privileges, and proper billing of calling services.

The present invention utilizes existing capabilities of satellites 12 and GWs 16 for automatic and transparent calibration of system 10. Those skilled in the art will recognize that changes and modification may be made in these embodiments without departing from the scope of the present invention.

Moreover, those skilled in the art will appreciate that the flowcharts presented herein are intended to teach the present invention and that different techniques for implementing program flow that do not necessarily lend themselves to flow charting may be devised. In particular, each task discussed herein may be interrupted to permit program flow to perform background or other tasks.

In addition, the specific order of tasks may be changed, and the specific techniques used to implement the tasks may differ from system to system. These and other changes and modification which are obvious to those skilled in the art are intended to be included within the scope of the present invention.

What is claimed is:

1. In a radio telecommunication system employing accurate location data of a user for communication routing and access control, a method of calibrating said radio telecommunication system to generate said accurate location data from measured signal parameters as measured by said user and modified by variance data stored in a gateway, said method comprising the steps of:

(a) generating measured signal parameters between a satellite and a calibration subscriber unit;

(b) receiving precision location data from an alternate location source at said calibration subscriber unit;

(c) forwarding said measured signal parameters and said precision location data to said gateway from said satellite; and (d) generating said variance data to be used to correct subsequent location processing at said gateway.

2. A method as recited in claim 1, wherein step (b) comprises the steps of:

(b1) performing a current location process using said alternate location source; and (b2) said alternate location source forwarding said precision location data to said calibration subscriber unit.

3. A method as recited in claim 1, wherein step (b) comprises the steps of:

(b11) receiving precision location data associated with a fixed-location data source; and (b12) forwarding said precision location data to said calibration subscriber unit associated with a fixed site.

4. A method as recited in claim 3, wherein step (b11) further comprises the step of entering said fixed precision location data into said calibration subscriber unit.

5. A method as recited in claim 1, further comprising the steps of:

associating said measured signal parameters and said precision location data at said calibration subscriber unit; and transmitting said measured signal parameters and said precision location data to said satellite from said calibration subscriber unit.

6. A method as recited in claim 1, wherein step (d) comprises the steps of:

(d1) generating a satellite access request message containing said measured signal parameters and said precision location data at said satellite; and (d2) transmitting said satellite access request message to said gateway by said satellite.

7. A method as recited in claim 1, wherein step (e) further comprises the steps of:

(e1) generating a calibration record containing said measured signal parameters and said precision location data by said gateway; and (e2) analyzing said calibration record by said gateway.

8. A method as recited in claim 7, further comprising the step of concurrently completing a geolocation process using said measured signal parameters and said precision location data.

9. A method as recited in claim 7, further comprising the step of distributing said variance data to other gateways to be used to correct future geolocations through said satellite involving said other gateways.

* * * * *

UNITED STATES PATENT AND TRADEMARK OFFICE
CERTIFICATE OF CORRECTION

PATENT NO. : 5,617,101
DATED : April 1, 1997
INVENTOR(S) : Kristine P. Maine et al.

It is certified that error appears in the above-identified patent and that said Letters Patent is hereby corrected as shown below:

In section [75] Inventors, change "Dean P.V. Heuvel" to --Dean P. Vanden Heuvel--.

In column 8, claim 7, line 44, change "(e)" to --(d)--.

In column 8, claim 7, line 46, change "(e1)" to --(d1)--.

In column 8, claim 7, line 49, change "(e2)" to --(d2)--.

Signed and Sealed this

Seventh Day of October, 1997

Attest:

BRUCE LEHMAN

*Attesting Officer*     Commissioner of Patents and Trademarks